United States Patent [19]

Stoll et al.

[11] Patent Number: 4,554,147

[45] Date of Patent: Nov. 19, 1985

[54] METHOD FOR TREATING FUMED SILICA

[75] Inventors: Robert W. Stoll, Schenectady; Michael R. MacLaury, Rexford, both of N.Y.

[73] Assignee: General Electric Company, Schenectady, N.Y.

[21] Appl. No.: 595,766

[22] Filed: Apr. 2, 1984

[51] Int. Cl.⁴ .............................................. C01B 33/18
[52] U.S. Cl. .................................... 423/335; 423/336; 423/337; 427/213; 427/219
[58] Field of Search ............... 423/325, 335, 336, 337, 423/340; 427/213, 219; 252/315.6, 313.2

[56] References Cited

U.S. PATENT DOCUMENTS

| | | | |
|---|---|---|---|
| 2,732,398 | 1/1956 | Brice et al. | 204/59 F |
| 3,983,148 | 9/1976 | Reedy et al. | 556/451 |
| 4,030,940 | 6/1977 | Chuiko et al. | 427/213 |
| 4,120,937 | 10/1978 | Blount . | |
| 4,274,883 | 6/1981 | Lumbeck et al. . | |
| 4,340,090 | 7/1982 | Matsushita et al. | 427/387 |
| 4,393,255 | 7/1983 | Mitchell et al. | 585/639 |
| 4,412,080 | 10/1983 | Williams, Jr. | 556/460 |
| 4,503,092 | 3/1985 | Klebe et al. | 423/335 |

FOREIGN PATENT DOCUMENTS 1031764  6/1966  United Kingdom ............... 423/336

OTHER PUBLICATIONS

*The Encyclopedia of Chemistry*, 3rd ed., Ed., Clifford Hampel, Gessner Hawley, Van Nostrand Reinhold Co., 1973, pp. 1071-1073.

Primary Examiner—John Doll
Assistant Examiner—Jeffrey E. Russel
Attorney, Agent, or Firm—William A. Teoli; James C. Davis, Jr.; James Magee, Jr.

[57] ABSTRACT

A method for treating fumed silica in a continuous manner is provided by effecting contact between the fumed silica, while in a fluidized state, with a methyl substituted chlorosilane, hydrochloric acid and a surfactant.

1 Claim, 1 Drawing Figure

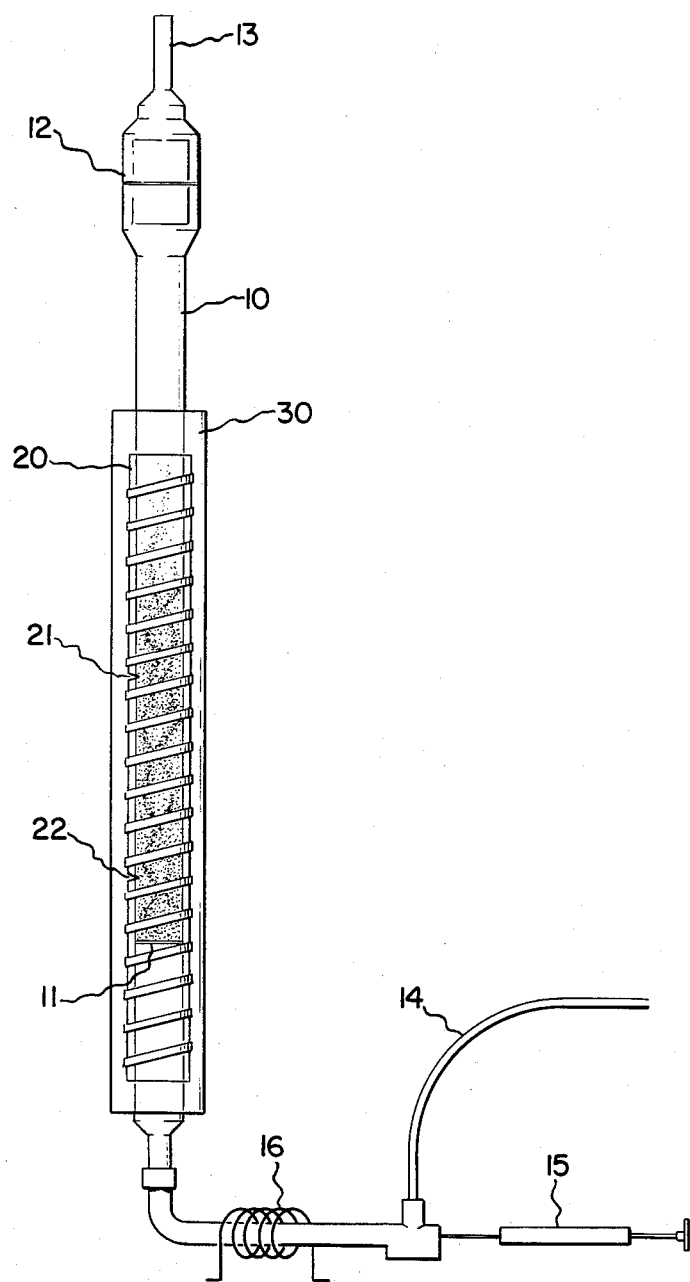

METHOD FOR TREATING FUMED SILICA

BACKGROUND OF THE INVENTION

The present invention relates to a method for treating fumed silica in a continuous manner utilizing methyl substituted chlorosilane, aqueous hydrochloric acid and a surfactant.

Prior to the present invention, various methods were available for treating fumed silica to eliminate or reduce surface silanol groups on the surface of such silica. Experience has shown that untreated fumed silica or fumed silica having an average of about 1.9 to 5.3 silanol radicals/nm$^2$ interacts with polydimethylsiloxane gum when used to reinforce such silicon gum resulting in crepe hardening. Crepe hardening is characterized by the compound being crumbly instead of elastic or soft. Crepe hardening is due to the formation of a network of polymer/filler particles that are loosely and reversibly "cross-link" to each other. This polymer-filler interaction is controlled by the hydrogen bonding between the silica surface silanols and both residual silanols in the silicon polymer and the oxygen of the polymer backbone itself.

Various procedures have been used to reduce the level of silanol on untreated fumed silica which can be in the form of the more reactive isolated silanols and both adjacent silanol and hydrogen bonded water. One procedure involves the batch treatment of the fumed silica over the period of several hours, such as 6 hours or more, with octamethylcyclotetrasiloxane. This treatment results in the production of fumed silica having surface silanol groups substantially eliminated.

Another procedure of treating silica filler is shown by A. Chuiko et al, U.S. Pat. No. 4,030,940, which shows silica filler treated with methylchlorosilane in the vapor phase and optionally in the presence of steam. An additional procedure for using fumed silica pretreated with dimethyldichlorosilane is shown by Matsushita et al, U.S. Pat. No. 4,340,090, directed to silicon compositions.

Although various procedures are available for treating silica filler treatment to enhance filler surface characteristics, improvements are constantly being sought. Particular emphasis is being directed to steps to reduce costs while maintaining improved filler characteristics. The present invention is based on the discovery that fumed silica can be treated economically in a continuous manner to achieve an optimum degree of surface pacification and thereby decrease interaction between polydimethylsiloxane gum and the filler by effecting contact between the fumed silica while in a fluidized state and at a temperature in excess of 400° C., with a mixture of methylchlorosilane having the formula, $$(CH_3)_aSiCl_{4-a}, \quad (1)$$

water or hydrochloric acid, and surfactant as defined hereinafter, where a is an integer having a value of from 1 to 3 inclusive.

STATEMENT OF THE INVENTION

There is provided by the present invention a method for treating silanol containing fumed silica having up to about 5.3 silanol radicals/nm$^2$ to substantially reduce its silanol level which comprises (1) contacting the fumed silica, while in a fluidized state, with a mixture of
  (a) methylchlorosilane of formula (1),
  (b) water or hydrochloric acid, and
  (c) surfactant, where there is used from 1 to 10 moles of water or hydrochloric acid and $10^{-5}$ to $10^{-3}$ moles of surfactant, per mole of methylchlorosilane.

Some of the surfactants which can be utilized in the practice of the invention to achieve improved results with respect to effecting an optimum reduction in surface silanol are shown, for example, by Reedy et al U.S. Pat. No. 3,983,148, and Williams U.S. Pat. No. 4,412,080, assigned to the same assignee as the present invention. Preferably, the surfactants are perfluorinated $C_8$ to $C_{10}$ alkyl sulfonic acid salts, available commercially from Minnesota Mining and Manufacturing Company, under the trade name Fluorad FC-95 fluorocarbon surfactant, shown by Trott, U.S. Pat. No. 2,732,398, incorporated herein by reference.

Some of the perfluoroalkyl sulfonic acid salts having the formula $$(C_xF_{2x+1})SO_3M,$$

where M is an alkali metal such as potassium, sodium, lithium, or a tetraalkyl ammonium radical, and x is an integer having a value of 6 to 16, can be used.

As used hereinafter, the term "surface area" is based on the theories developed by Bruanuer, Emmett and Teller (BET) J. Amer. Chem. Soc. 60, 309 (1938). Nitrogen is used, which is also used to calculate the "C factor" which is related to the nitrogen heat of adsorption. The C factor is a measure of the polarity of the surface. An increasing C factor indicates an increasing surface polarity. It has been found that a silica treated with trimethylchlorosilane exhibits a decrease in surface area of about 20% and about a 75% decrease in C factor. These results correspond to a degree of surface coverage determined by carbon analysis. The C factor decreases as the amount of trimethylsilylation increases.

In the practice of the method of the present invention, the methylchlorosilane, hydrochloric acid and the surfactant are introduced into a reactor containing a fluidized bed of fumed silica at an elevated temperature. Fluidization of the fumed silica can be achieved by use of an inert gas, such as nitrogen, argon, etc. Effective surface treatment can be achieved at about atmospheric pressure at temperatures in the range of from about 300° C. to 600° C.

Experience has shown that a proportion of from about 1 to 10 moles of methylchlorosilane, per mole of silanol will provide effective results.

As utilized hereinafter, the term silanol or surface silanol means the silanol characterized by an infrared stretching frequency of about 3747 cm$^{-1}$. Such silanol also has been commonly characterized as "isolated silanol" by several authors. Absorption intensity is directly proportional to surface concentration as reported by Boonstra et al. (Rubber Chemistry and Technology 48, 558 (1975). Preferably, filler treated in accordance with the practice of the present invention has less than 0.02 silanol radicals per/nm$^2$.

In order that those skilled in the art will better understand the practice of the method of the present invention, reference is made to the drawing. The drawing is a schematic of one type of fluidized bed reactor which can be used to practice the method of the present invention.

More particularly, there is shown at 10 a reactor tube which can be made out of a temperature resistant material, for example, Pyrex glass. The base of the fluidized bed is shown at 11 which shows a supporting plate for the bed in the form of a medium frit. The reactor tube is joined at 12 through a Teflon ® resin sleeve not shown, to an upper section of the reactor tube having a constriction at the top at 13 through which unreacted volatiles are directed to a trap not shown.

An inert gas which serves to support the fluidized bed is introduced at 14. There can be utilized for example, nitrogen or argon, etc. Reactants, for example, methylchlorosilane, surfactant, hydrochloric acid, can be introduced in a controlled manner at 15 and thereafter vaporized prior to being introduced into the fluid bed at 16. The temperature of the bed can be maintained by use of a heating means, such as a quartz tube at 20 wrapped with nichrome wire. The temperature of the furnace can be monitored by use of thermocouple ports at 21 and 22. An outer tube, for example quartz, is shown at 30 which serves as a protective covering over the furnace.

In order that those skilled in the art will be better able to practice the invention, the following examples are given by way of illustration and not by way of limitation. All parts are by weight unless otherwise indicated.

jected at a rate sufficient to provide 0.30 ml over the 30 minute period. There also was introduced 0.15 mg $C_{8-10}F_{17-21}SO_3^-K^+$ surfactant dissolved in 0.20 ml of 7.4% hydrochloric acid over the 30 minute period. The reactants were injected into a vaporization section which was heated to 180° C. Reaction time was 30 minutes with a 15 minute post injection hold at 450° C. to insure complete reaction and purge and silica of unreacted reagents and by-products. All reactants were injected with 2 cc syringes.

The above experiment was repeated, except that the concentration of the hydrochloric acid was increased to 18.5% and the concentration of the surfactant was varied from 0.54 to 4.7 times over that utilized above. In addition, a control experiment was run by heating one gram fumed silica at 450° C. for 45 minutes in the fluidized bed reactor without the use of any treating agents. The results were measured by comparing the values of the isolated silanol (3747 cm$^{-1}$), adjacent silanol (3650 cm$^{-1}$) and bound water (3400 cm$^{-1}$) of the control as compared to the fumed silica treated in accordance with the practice of the present invention.

The following results were obtained where "Batch Process" shows the surface characteristics of fumed silica treated by the batch method of prior art utilizing octamethylcyclotetrasiloxane or D$_4$ as the treating agent over a period of about 6 hours at 275° C. while being agitated, where "surf" is $C_{8-10}F_{17-21}SO_3^-K^+$ and "silane" is dimethyldichlorosilane:

TABLE 1

| Conditions[5] | Isolated Silanols[1] | % Reacted[2] | Adjacent Silanols[1] | % Reacted[2] | Hydrogen Bonded Water[1] | % Reacted[2] | Methyl Groups[1] | Relative Intensity[3] | Surface Area[4] | C Factor[4] |
|---|---|---|---|---|---|---|---|---|---|---|
| Control | 4.95 | 0.0 | 2.59 | 0.0 | 1.83 | 0.0 | — | — | 225 | 78.7 |
| D4 Batch Process | 0.00 | 100 | 1.74 | 33 | .70 | 62 | 3.60 | 4.0 | 182 | 30.0 |
| .3 ml silane + .2 ml 7.4% HCl + surf | .83 | 83 | 1.35 | 48 | .72 | 61 | 2.37 | 2.7 | 198 | 39.8 |
| .3 ml silane + .2 ml 18.5% HCl + surf | 1.05 | 79 | 1.83 | 29 | 1.04 | 43 | 1.85 | 2.0 | 202 | 42.8 |
| .3 ml silane + .2 ml 7.4% HCl + surf | 1.27 | 74 | 1.52 | 41 | .90 | 51 | 1.82 | 2.0 | 200 | 42.1 |
| .3 ml silane + .2 ml 7.4% HCl + 2X surf | 1.37 | 72 | 1.73 | 33 | 1.00 | 45 | 1.80 | 2.0 | 203 | 43.8 |
| .3 ml silane + .2 ml 7.4% HCl + 4.7X surf | 1.29 | 74 | 1.69 | 35 | .97 | 47 | 1.75 | 1.9 | 198 | 44.8 |
| .3 ml silane + .2 ml 7.4% HCl + 0.54X surf | 1.52 | 69 | 1.58 | 39 | .96 | 48 | 1.72 | 1.9 | 203 | 44.8 |
| .3 ml silane + .2 ml 7.4% HCl + 1X surf | .75 | 85 | .95 | 63 | .52 | 72 | 1.40 | 1.5 | 199 | 41.1 |
| .3 ml silane | 1.30 | 74 | 2.27 | 12 | 1.63 | 11 | 0.91 | 1.0 | 215 | 53.5 |

[1]Infrared absorbance normalized for sample size by dividing indicated absorbance peak by SiO$_2$ lattice absorbance at 1860 cm$^{-1}$, 3747 cm$^{-1}$ (isolated silanol); 3650 cm$^{-1}$ (adjacent, hydrogen bonded silanol); 3400 cm$^{-1}$ (hydrogen bonded water); 2970 cm$^{-1}$ (methyl groups).
[2]% change from Control.
[3]Relative to 0.3 ml silane.
[4]Determined by BET Nitrogen adsorption measurement and the C factor is realted to the heat of adsorption of N$_2$ onto the surface.
[5]All reactions were done using 1 gram MS-7 fumed silica at 450° C. except D4 Batch Process where D4 was reacted at 275° C. for 6 hours. There are 5.3 × 10$^{-4}$ moles isolated silanol/gram fumed silica. Batch D4 Process used 8.1 × 10$^{-4}$ moles D4/gram fumed silica, .16 ml D4 = 5.2 × 10$^{-4}$ moles D4 gram fumed silica, and .30 ml Me$_2$SiCl$_2$ = 2.5 × 10$^{-3}$ moles Me$_2$SiCl$_2$/gram fumed silica.

EXAMPLE 1

There was placed in a fluid bed reactor having a one inch diameter Pyrex reactor one gram of fumed silica (MS-7 of the Cabot Corporation). The reactor was maintained at a temperature of 450° C.±15° C. using a model 4002 Omega temperature controller manufactured by Omega Engineering Inc., of Stamford, Conn. The bed of fumed silica was kept fluid using a nitrogen flow of 200 ml/min. Dimethyldichlorosilane was in- The above results show that filler treated 30 minutes in accordance with the practice of the present invention has 83% of the isolated silanol (3747 cm$^{-1}$) reacted which compares favorably with 100% achieved with fumed silica treated by a batch process over a period of 6 hours with octamethylcyclotetrasiloxane (D$_4$). Infrared adsorption and nitrogen isothermal adsorption data also showed that favorable results were achieved with respect to surface area, C factor and other silanols such as adjacent hydrogen bonded silanol and hydrogen bonded water as well as methyl group coverage at 2970 cm$^{-1}$ when a comparison is made between the practice of the method of the present invention utilizing the surfactant as compared to the batch process of the prior art employing octamethylcyclotetrasiloxane.

EXAMPLE 2

The procedure of Example 1 was repeated, except that in place of $C_{8-10}F_{17-21}SO_3^-K^+$ (FC-95 of the 3M Company) having an average molecular weight of 588.22 g/mole, there was used $C_{8-10}F_{17-21}N^+(CH_3)_3I^-$ (FC-135 of the 3M Company) having an average molecular weight of 655.08 g/mole and the sodium salt of 1-octane sulfonic acid monohydrate $C_8H_{17}SO_3^-Na^+\cdot H_2O$ of the Aldrich Chemical Company having a molecular weight of 234.36 g/mole. In particular instances, treatment of the fumed silica was achieved with hydrochloric acid alone at concentrations of 3.7%, 7.4% and 18.5% concentrations. The following results were obtained, where "silane" and "surf" are as previously defined, "surf II" is FC-135 and "surf III" is the sodium salt of 1-octane sulfonic acid monohydrate:

TABLE II

| Conditions[5] | Isolated Silanols[1] | % Reacted[2] | Adjacent Silanols[1] | % Reacted[2] | Hydrogen Bonded Water[1] | % Reacted[2] | Methyl Groups[1] | Relative Intensity[3] | Surface Area[4] | C Factor[4] |
|---|---|---|---|---|---|---|---|---|---|---|
| .3 ml silane + .2 ml 7.4% HCl + surf III | 1.34 | 73 | 1.62 | 38 | .89 | 51 | 1.82 | 2.0 | 203 | 44.4 |
| .3 ml silane + .2 ml 7.4% HCl + surf II | 1.61 | 68 | 1.61 | 38 | .92 | 50 | 1.74 | 1.9 | 202 | 44.2 |
| .3 ml silane + .2 ml 18.5% HCl + | .98 | 80 | 1.34 | 48 | .72 | 61 | 1.89 | 2.1 | 200 | 39.9 |
| .3 ml silane + .2 ml 18.5% HCl + | 1.34 | 73 | 1.57 | 39 | .94 | 49 | 1.88 | 2.1 | 198 | 44.0 |
| .3 ml silane + .2 ml 7.4% HCl + | 1.08 | 78 | 1.17 | 55 | .58 | 68 | 1.87 | 2.1 | 207 | 42.5 |
| .3 ml silane + .2 ml 3.7% HCl + | 1.13 | 77 | 1.53 | 41 | .86 | 53 | 1.86 | 2.0 | 197 | 41.7 |
| .3 ml silane + .2 ml H$_2$O | 1.33 | 73 | 1.44 | 44 | .77 | 58 | 1.80 | 2.0 | 208 | 43.6 |
| 1.0 ml silane | .20 | 96 | 1.22 | 53 | .70 | 60 | 1.20 | 1.3 | 205 | 30.0 |
| .16 ml D4 + .2 ml 7.4% HCl + surf I | 3.10 | 37 | 2.38 | 8 | 1.53 | 16 | .92 | 1.0 | 218 | 58.7 |
| .16 ml D4 | 3.38 | 32 | 2.02 | 22 | 1.35 | 26 | .92 | 1.0 | 215 | 59.9 |
| .3 ml silane | 1.30 | 74 | 2.27 | 12 | 1.63 | 11 | .91 | 1.0 | 215 | 53.5 |
| .3 ml silane | 1.18 | 76 | 1.80 | 31 | 1.24 | 12 | .87 | 1.0 | 210 | 47.2 |
| .2 ml 3.7% HCl | 4.55 | 8 | 2.90 | −12 | 2.03 | −11 | — | — | 226 | 78.8 |
| .2 ml 18.5% HCl | 4.75 | 4 | 2.96 | −14 | 2.08 | −14 | — | — | 227 | 79.3 |
| .2 ml H$_2$O | 5.01 | −1 | 2.37 | 9 | 1.60 | 13 | — | — | 225 | 79.8 |
| .2 ml 7.4% HCl | 5.23 | −6 | 2.27 | 12 | 1.52 | 17 | — | — | 229 | 78.1 |

[1]Infrared absorbance normalized for sample size by dividing indicated absorbance peak by SiO$_2$ lattice absorbance at 1860 cm$^{-1}$, 3747 cm$^{-1}$ (isolated silanol); 3650 cm$^{-1}$ (adjacent, hydrogen bonded silanol); 3400 cm$^{-1}$ (hydrogen bonded water); 2970 cm$^{-1}$ (methyl groups).
[2]% change from Control.
[3]Relative to 0.3 ml silane.
[4]Determined by BET Nitrogen adsorption measurement and the C factor is realted to the heat of adsorption of N$_2$ onto the surface.
[5]All reactions were done using 1 gram MS-7 fumed silica at 450° C. except D4 Batch Process where D4 was reacted at 275° C. for 6 hours. There are 5.3 × 10$^{-4}$ moles isolated silanol/gram fumed silica. Batch D4 Process used 8.1 × 10$^{-4}$ moles D4/gram fumed silica, .16 ml D4 = 5.2 × 10$^{-4}$ moles D4 gram fumed silica, and .30 ml Me$_2$SiCl$_2$ = 2.5 × 10$^{-3}$ moles Me$_2$SiCl$_2$/gram fumed silica.

The above results show that the surface treatment mixture of the present invention in the form of a mixture of dimethyldichlorosilane, hydrochloric acid and surfactant effects a significant reduction in surface silanol and imparts a high degree of improved surface characteristics to the treated filler surface. Although dimethyldichlorosilane at 1 ml level, effected 96% reaction of the isolated silanol, those skilled in the art would know that the 0.3 ml of silane required in Example 1 for 83% conversion would require significantly less recycling of unreacted dimethyldichlorosilane under continuous conditions.

EXAMPLE 3

The procedure of Example 2 is repeated except that there is introduced into the reaction 0.5 ml of dimethyldichlorosilane, 0.25 mg of surfactant of Example 1 and 0.33 ml of 7.4% hydrochloric acid over a 30 minute period. It is found that the resulting treated fumed silica filler has substantially the same improved surface characteristics as the filler treated with 1 ml of dimethyldichlorosilane, or less than 0.02 silanol radicals per/nm$^2$.

Although the above examples are directed to only a few of the very many variables which can be used in the practice of the method of the present invention, it should be understood that the present invention is directed to the use of a broad variety of methylchlorosilanes as shown by formula (1) and surfactant and filler, as shown in the description preceding these examples.

What we claim as new and desire to secure by Letters Patent of the United States is:

1. A method for treating silanol-containing fumed silica having up to about 5.3 silanol radicals/nm$^2$ to substantially reduce its silanol level which comprises
   (1) contacting the silanol-containing fumed silica, while in a fluidized state, at a temperature in the range of from about 300° C. to about 600° C. with a mixture of
   (a) dimethyldichlorosilane
   (b) hydrochloric acid having a concentration of about 7.4% of HCl, and
   (c) surfactant having the formula, $$C_{8-10}F_{17-21}SO_3^-K^+,$$

where there is used from 1 to 10 moles hydrochloric acid and 10$^{-5}$ to 10$^{-3}$ moles of surfactant, per mole of dimethyldichlorosilane.

* * * * *